(12) United States Patent
Geng et al.

(10) Patent No.: US 8,415,839 B2
(45) Date of Patent: Apr. 9, 2013

(54) APPARATUS AND METHODS FOR MITIGATING ELECTROMAGNETIC EMISSIONS

(75) Inventors: Steven M. Geng, Parma, OH (US); Janis M. Niedra, N. Ridgeville, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 1174 days.

(21) Appl. No.: 12/319,617

(22) Filed: Jan. 9, 2009

(65) Prior Publication Data

US 2011/0175369 A1  Jul. 21, 2011

(51) Int. Cl.
*H02K 33/16* (2006.01)
*H02P 7/00* (2006.01)

(52) U.S. Cl.
USPC ............. 310/15; 310/12.01; 310/17; 417/417

(58) Field of Classification Search .... 310/12.01–12.33, 310/15–36; 417/416, 417, 44.1, 44.11
See application file for complete search history.

(56) References Cited

U.S. PATENT DOCUMENTS

| | | | |
|---|---|---|---|
| 4,242,658 A | 12/1980 | Helinski | |
| 4,937,481 A * | 6/1990 | Vitale | 310/15 |
| 5,148,066 A | 9/1992 | Beale et al. | |
| 5,349,256 A | 9/1994 | Holliday | |
| 5,654,596 A | 8/1997 | Nasar et al. | |
| 5,923,104 A | 7/1999 | Haaland et al. | |
| 5,952,734 A | 9/1999 | Gelbien | |
| 6,570,275 B2 * | 5/2003 | Kim et al. | 310/12.14 |
| 6,946,754 B2 * | 9/2005 | Inagaki et al. | 310/12.25 |
| 2005/0189824 A1 * | 9/2005 | Jeong et al. | 310/15 |
| 2007/0108850 A1 * | 5/2007 | Chertok | 310/15 |
| 2008/0074783 A1 | 3/2008 | Ohashi | |
| 2008/0122408 A1 | 5/2008 | Keiter et al. | |

* cited by examiner

*Primary Examiner* — Tran Nguyen
*Assistant Examiner* — Leda Pham
(74) *Attorney, Agent, or Firm* — McDonald Hopkins LLC; Robert H. Earp, III

(57) ABSTRACT

Apparatus, methods, and other embodiments associated with mitigation of magnetic fields are described herein. In an embodiment, a method for mitigating an electromagnetic field includes positioning a mitigating coil around a linear alternator of linear motor so that the mitigating coil is coaxially located with an alternator coil; arranging the mitigating coil to generate a field to mitigate an electromagnetic field generated by the alternator coil; and passing an induced current from the alternator coil through the mitigating coil.

8 Claims, 6 Drawing Sheets

$$\vec{B}(\vec{r}) = \frac{\mu_0}{4\pi r^3} \left[ 3\vec{u}_r (\vec{u}_r \bullet \vec{m}) - \vec{m} \right]$$

where $\vec{r}$ is the position vector from the magnetic moment $\vec{m}$ to the point of observation
$\vec{u}_r$ is a unit vector along $\vec{r}$

Figure 4A $$B = \frac{\mu_0}{4\pi r^3} NIA_c (1 + 3\cos^2 \phi)^{1/2}$$

Figure 4B $$n = N/[w(r_2 - r_1)]$$

Figure 4C $$m = In\pi \int_0^w \int_{r_1}^{r_2} r^2 \, dr \, dz = \pi IN(r_1^2 + r_1 r_2 + r_2^2)/3.$$

APPARATUS AND METHODS FOR MITIGATING ELECTROMAGNETIC EMISSIONS

TECHNICAL FIELD

The present invention generally relates to apparatus and methods for mitigating electromagnetic emissions, and, more particularly, to apparatus and methods for mitigating electromagnetic emissions generated by a linear alternator or linear motor by superimposing a mitigation field onto the linear alternator or motor.

BACKGROUND

Electrical power may be generated by a variety of technologies implementing a variety of physical principles. One physical principle used to generate power is electromagnetic induction. One implementation of electromagnetic induction is a linear alternator, which is typically arranged so that a permanent magnet oscillates linearly along the central axis of a wound wire coil to induce an electromotive force in the wire coil. When connected to a load, the electrical current may be harnessed to provide electrical power. While linear alternators are practical and efficient, such arrangements typically emit an electromagnetic field that is generated by the magnets and coil of the linear alternator. Depending on the implementation, external electromagnetic fields are undesirable because such fields create an undesirable environment. Specifically, electromagnetic fields may interfere with sensitive instrumentation situated near a linear alternator. Therefore, linear alternators are not practical for implementations where electrical power generating equipment must be located near instrumentation that is sensitive to electromagnetic emissions.

In the prior art, shielding techniques have been used to limit interference from electromagnetic fields. Such shielding techniques typically include surrounding a linear alternator with metal sheeting or plating in an attempt to contain electromagnetic interference. Such techniques may substantially add to the weight of a linear alternator and make the alternator impractical for weight sensitive applications. In addition, shielding techniques also may create thermal management problems for any equipment that is being shielded, along with any equipment situated near the shielded equipment.

Because of the limitations of the prior art, there exists a need for novel apparatus and methods for mitigating electromagnetic interference emitting from linear alternators.

SUMMARY

Apparatus, methods, and other embodiments associated with mitigation of magnetic fields are described herein. In an embodiment, a method for mitigating an electromagnetic field includes positioning a mitigating coil around a linear alternator so that the mitigating coil is coaxially located with an alternator coil; arranging the mitigating coil to generate a bucking field to mitigate an electromagnetic field generated by the alternator coil; and passing an induced current from the alternator coil through the mitigating coil.

DESCRIPTION OF DRAWINGS

Operation of the invention may be better understood by reference to the following detailed description taken in connection with the following illustrations, wherein:

FIG. 4A is an equation for determining magnetic field for a point-like magnetic dipole;

FIG. 4B is an equation for determining the magnitude of the magnetic field given in FIG. 4A;

FIG. 4C is an equation for determining the area density of turns in a coil;

FIG. 4D is an equation for determining the total magnetic moment of a coil; and

FIG. 4E is an equation for determining the radius of a representative loop.

DETAILED DESCRIPTION

While the present invention is described with reference to the embodiments disclosed herein, it should be clear that the present invention should not be limited to such embodiments. Therefore, the description of the embodiments herein is only illustrative of the present invention and should not limit the scope of the invention as claimed.

The present invention is directed to apparatus and methods for balancing, counteracting, reducing, or otherwise mitigating electromagnetic field emissions or electromagnetic interference emanating from a linear alternator. In an embodiment, electromagnetic interference is mitigated by apparatus and methods that provide magnetic moment balancing. Magnetic moment balancing superimposes a mitigating field onto a linear alternator to at least partially cancel or mitigate the electromagnetic field generated by the linear alternator. In an embodiment, a mitigating coil is wound around the linear alternator to generate the mitigating field. The mitigating coil may be wound so that the mitigating coil and alternator coil are coaxially located. In addition, the mitigating coil may be arranged so that the electrical current provided to the mitigating coil flows in the opposite direction of the electrical current generated in the alternator coil. In an embodiment, the mitigating coil may be connected to the alternator coil so that the electrical current generated in the alternator coil supplies the current to the mitigating coil. In one example, the alternator coil is connected in series to the mitigating coil.

As will be described in detail, apparatus and methods for mitigating electromagnetic fields generated by linear alternators may be applicable to especially solenoidal type linear alternators. The description herein will include, but not be limited to, specific examples of mitigation of electromagnetic fields generated by linear alternators that are often positioned near sensitive equipment and are deployed in weight-sensitive embodiments.

Figure 1:
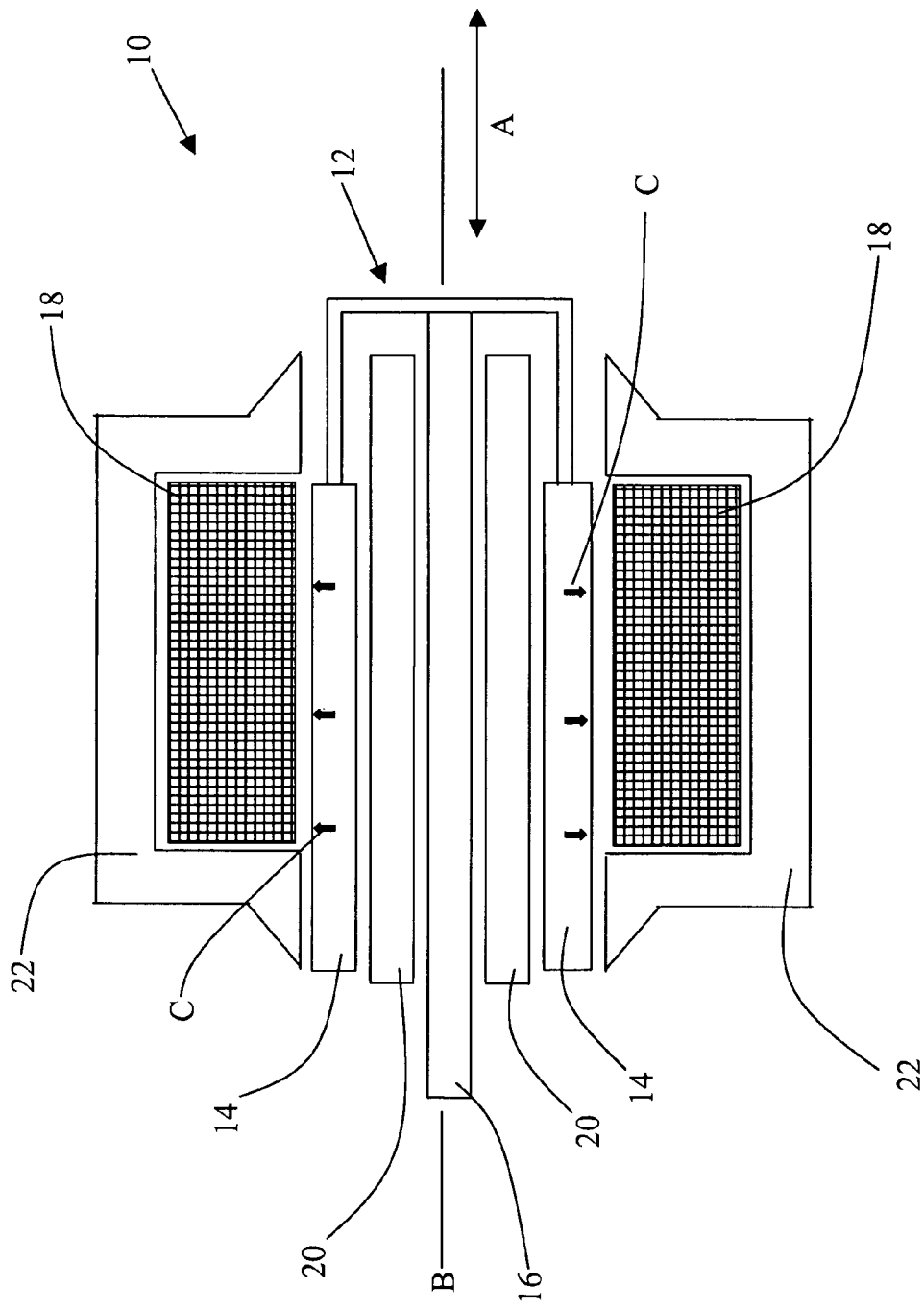
FIG. 1 is a schematic illustration of a linear alternator.

Reference will now be made to the figures in describing linear alternators and mitigating apparatus and methods for linear alternators. An exemplary embodiment of a linear alternator 10 is schematically shown in cross-section in FIG. 1. The alternator 10 includes a plunger 12 arranged to move laterally along a line or path (indicated by reference character A in FIG. 1). The plunger 12 includes at least one permanent magnet 14 and a stem 16 extending from the plunger 12. As is further described below, the plunger 12 is commonly equipped with a number of permanent magnets. The stem 16 is typically coupled to a mechanism for driving or moving the plunger 12 laterally along the direction of path A so that the magnet 14 also moves laterally parallel to path A. As will be understood by those skilled in the art, the linear alternator 10 is shown schematically for clarity and simplicity and is representative of a number of linear alternator arrangements of varying complexity. For example, although a single cylindrical magnet 14 is shown schematically in cross-section in FIG. 1, it will be understood by those skilled in the art that any number of magnets may be included in a linear alternator. In one embodiment, a plurality of magnets is positioned to form a generally continuous cylindrical or can-like structure around the stem 16. Each magnet may be arc shaped and be polarized radially so that the magnetic field emanating from the combined cylindrical magnet structure is consistent along the outer surface of the cylindrical structure of the magnets. The number of magnets and arrangement of such magnets may be determined by specific design of the linear alternator, specific use of the linear alternator, fabrication and manufacturing constraints, and the like.

An alternator coil 18 is wound coaxially relative to the plunger 12 in a generally solenoid structure so that a central axis B of the coil 18 is generally equidistant from each magnet or each portion of a single cylindrical magnet 14. In an arrangement of a generally cylindrical magnet structure, the coil 18 and cylindrical magnets may be coaxially located. The linear alternator 10 further includes an inner stator 20 and an outer stator 22. Again, the schematic figures illustrate a single inner stator 20 and a single outer stator 22 for simplicity and clarity. It will be understood by those skilled in the art that the inner stator 20 may have a generally cylindrical structure that is coaxially located with the magnets 14 and alternator coil 18. Likewise, the outer stator 22 may have a generally cylindrical structure that is coaxially located with the magnets and alternator coil 18. In addition, the inner 20 and outer 22 stators may be comprised of a number of individual components joined together to form a stator.

As the plunger 12 is oscillated laterally along path A, it will be understood that the magnet 14 also moves laterally with respect to the central axis B of the alternator coil 18. Such lateral movement causes a magnetic field generated by the magnet 14 (which radiates in the direction of arrows C) to also cyclically link the coil 18 in opposite directions. Such movement induces an electrical current in the alternator coil 18. When such an electrical current is generated, the current may be harnessed to provide electrical power.

In one embodiment, the force to drive the linear movement of the plunger 12 is provided by a Stirling engine. Such engines are described in detail in *Stirling Engines* by Graham Walker, published in 1980 by The Clarendon Press, Oxford. Generally, a Stirling engine operates on a Stirling cycle, which is a closed thermodynamic cycle that uses the expansion and contraction of gases to produce mechanical movement. Such a cycle is thermodynamically efficient and is capable of practical implementations as an engine or power generator. One specific implementation of a Stirling engine is an Advanced Stirling Radioisotope Generator (ASRG). Stirling engine driven linear alternators, specifically those utilized by ASRGs, are promising candidates for providing electrical power for spacecrafts designed for deep space missions, such as missions to outer planets where the use of solar energy is impractical. However, spacecrafts are typically designed to conserve space and weight. Therefore, equipment for spacecrafts is often placed in close proximity to other equipment and is designed to minimize weight. For an ASRG type linear alternator designed for a spacecraft, unmitigated electromagnetic interference emanating from the alternator coil may interfere with sensitive instrumentation. For example, spacecrafts often include instruments such as magnetometers for field mapping, which may malfunction or produce erroneous results if subjected to electromagnetic interference. Techniques such as magnetic shielding would burden the spacecraft with excess weight, increasing the cost of launch and potentially limit the distance and duration that spacecraft could travel. Therefore, ASRG type linear alternators would benefit from novel apparatus and methods for mitigating electromagnetic fields emanating from the alternator coil.

Figure 2:
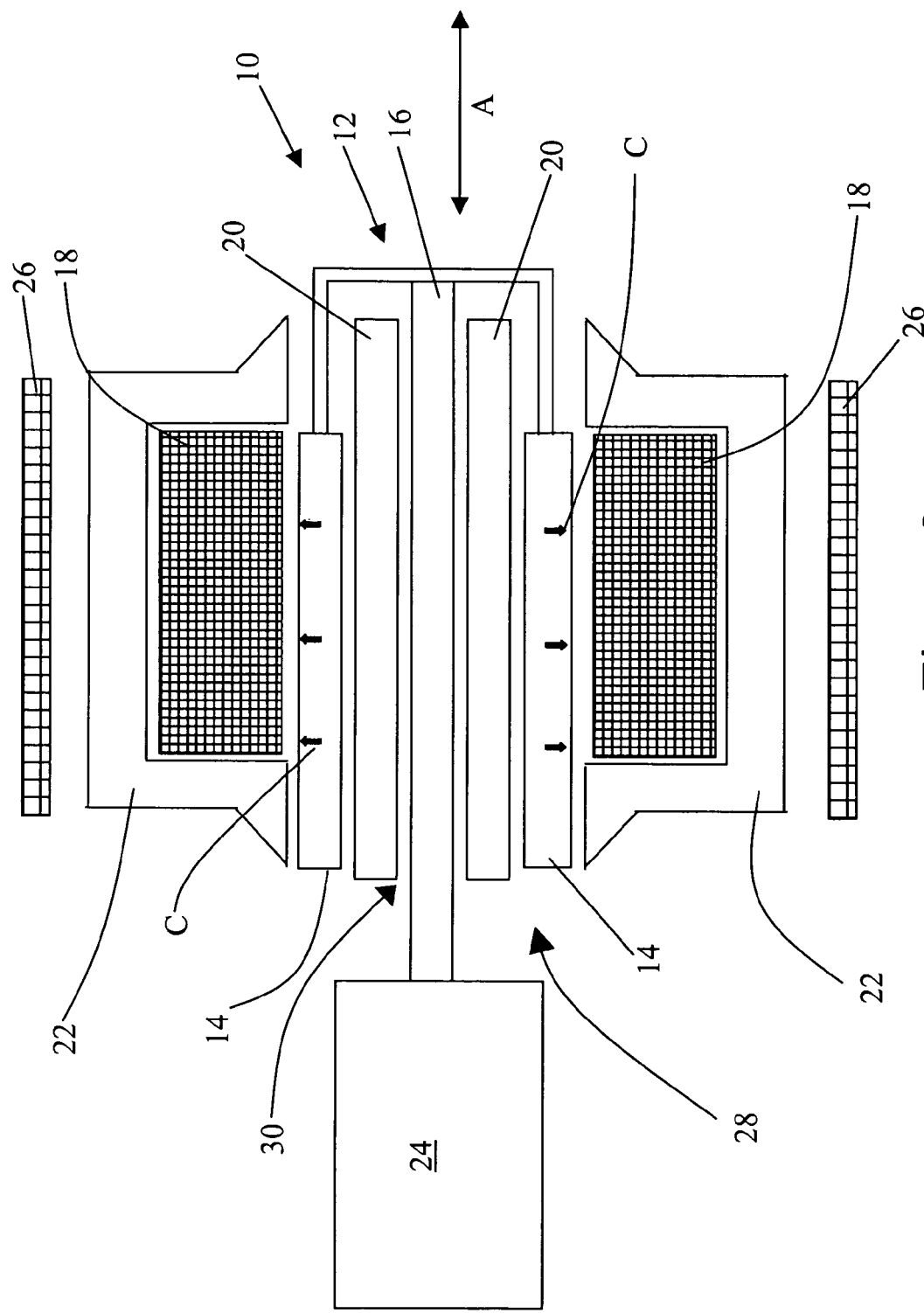
FIG. 2 is a schematic illustration of a linear alternator coupled to a drive mechanism and equipped with a mitigating coil.

An exemplary embodiment of a system for mitigating electromagnet emissions is illustrated in FIG. 2. The drive mechanism or power source (shown as functional block 24) for driving the linear alternator 10 is coupled to the plunger 12 to result in linear movement of the magnets 14 of the linear alternator 10. A mitigating coil 26 is positioned outside of the linear alternator 10 and is arranged to generate an electromagnetic field to magnetically balance the moment or otherwise mitigate the magnetic field generated by the linear alternator coil 18. Such magnetic moment balancing may cancel at least part of the electromagnetic field generated by the linear alternator coil 18 by superimposing a mitigating field onto the field generated by the linear alternator coil 18.

The arrangement and design of the mitigating coil 26 may be determined from an understanding of the electromagnetic fields produced by the oscillating magnets 14 and alternator coil 18. For example, a number of physical variables for the mitigating coil 26 may be adjusted to create an effective mitigating field for a given arrangement of magnets and alternator coils. Examples of such variables are: the number of turns or winds in the mitigating coil 26, the spacing between turns of the mitigating coil 26, and the distance the mitigating coil 26 is positioned from the linear alternator 10 or from the alternator coil 18 (i.e., the radius of the mitigating coil 26). By adjusting such variables, the mitigating coil 26 may be arranged to effectively balance or otherwise mitigate magnetic fields generated by many different linear alternator arrangements and configurations.

In one embodiment, the mitigating coil 26 is wound adjacent to the outer surface of the outer stator 22 and centered coaxially with respect to the alternator coil 18. The current provided to the mitigating coil 26 may flow in the opposite direction of the current generated in the alternator coil 18 to mitigate the electromagnetic field generated by the linear alternator 10. In an embodiment, the current provided to the mitigating coil 26 may be provided directly from the alternator coil 18 by connecting the mitigating coil 26 and alternator coil 18 in series. Such an arrangement efficiently uses the current generated by the linear alternator 10 to mitigate the external AC magnetic field due to the alternator coil 18. The use of the current generated by the linear alternator 10 conserves power because there is only a relatively minor loss in power when the current is passed through the mitigating coil 26. Such a system may be substantially more energy efficient than providing an independent source of power to pass a current through the mitigating coil 26.

In one embodiment, the linear alternator 10 includes a single coil of copper wiring arranged as a solenoid 18 with a substantial gap 28 between the stators 20, 22 to accept the linearly oscillating magnets 14. The inner stator cylinder 20 is comprised of laminations to form a laminated and hollow inner core 30. When current is induced in the alternator coil 18, a magnetic flux emits from the alternator coil 18 in a generally toroidal shell pattern surrounding the alternator coil 18 and passing through the hollow inner core 30 to complete the flux path.

Figure 3:
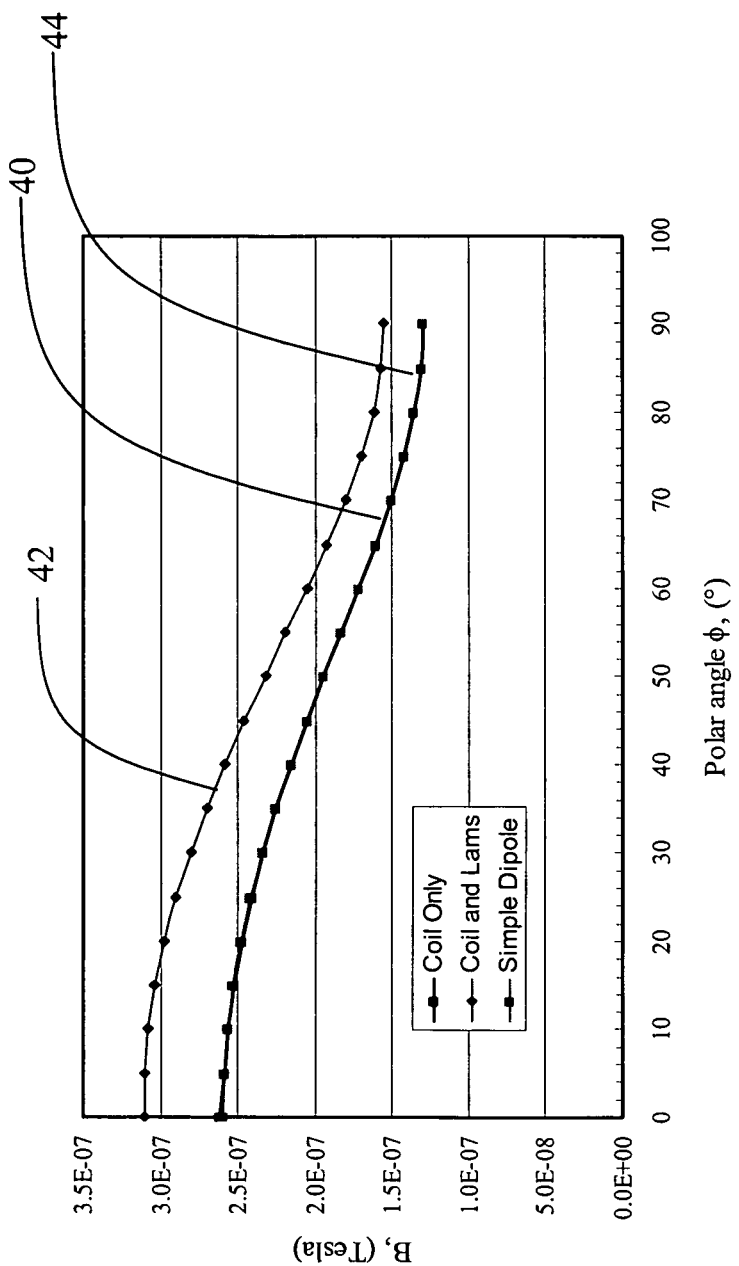
FIG. 3 is a chart plotting magnetic field versus polar angle, showing various contributions.

In an embodiment, methods have been developed to determine an effective physical arrangement of a mitigating coil for a given arrangement of linear alternator. For example, the number of turns or the radius of the mitigating coil may be determined from mathematical modeling, experimentation, or a combination of mathematical modeling and experimentation. In one embodiment, to determine a physical arrangement of a mitigating coil, it may be useful to determine how different components of the linear alternator contribute to the electromagnetic field generated by the linear alternator. For example, it may be shown that in certain arrangements, that the load current in the alternator coil is responsible for the majority of the AC magnetic field detected away from the linear alternator. In such arrangements, the contribution of the stator lamination magnetic material to the alternating current electromagnet field detected away from the linear alternator may be considerably less than the contribution of the alternator coil to the alternating current electromagnetic field. FIG. 3 illustrates a chart of magnetic field strength versus the angle phi, where angle phi is measured from the line of symmetry of the linear oscillator, i.e., the longitudinal axis passing through the hollow inner core. The magnetic field may be determined at a specific distance away from the center of a single alternator arrangement such as, for example, one meter away from the center of the alternator coil.

As can be seen in FIG. 3, such an arrangement behaves close to dipolar, having maximum amplitude at the axis where phi equals zero. A first curve 40 plots the magnetic field for the alternator coil only, where a steady current of 10 amperes is passing through the coil. A second curve 42 plots the magnetic field for the alternator coil and the stator laminations, where a steady current of 10 amperes is passing through the coil. In both the first 40 and second 42 curves, no magnet is in place in the alternator. A third curve 44 plots the magnetic field due to a point-like magnetic moment of strength 1.297 A m$^2$ aligned with the line of symmetry. The third curve may be derived through equations. From FIG. 3, it may be seen that the far field of the alternator coil generally coincides with the electromagnetic field of a point-like moment of equivalent strength. The stator laminations under the influence of the field of the alternator coil generally contributes a magnetic field that is similar to the geometry of the dipole like field of the coil, which results in a total field of about 1.2 times the field of the coil alone.

Figure 4E:
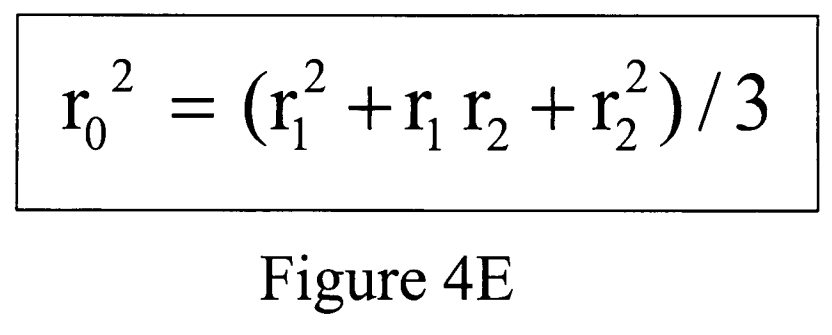

Because the far field of the alternator coil generally coincides with the electromagnetic field of a point-like moment of equivalent strength, the far field of the alternator coil may be approximated from equations for a magnetic field of a point-like dipole. Once the far field of the alternator coil is approximated, the mitigating coil may be arranged to generate a balancing field to mitigate the field generated by the alternator coil. FIG. 4A, illustrates such an equation for calculating the magnetic field of a point-like dipole. The field of a physically finite-sized dipole moment, such as the alternator coil, is asymptotic to that given by the equation of FIG. 4A, when the position vector is large compared to the size of the coil. Starting from the equation of FIG. 4A, the equation of FIG. 4B may be derived to determine the magnitude of the magnetic field, where N is the number of turns in a coil, I is the current in the coil, and $A_c$ is the cross-sectional area of a circular loop representing the moment of the alternator coil.

The cross-sectional area $A_c$ may be found by integrating the individual moments of the current loops that comprise the alternator coil. Therefore, for a coil that extends from an inner radius $r_1$ to an outer radius $r_2$ and has length w, the area density of turns may be calculated by the equation illustrated in FIG. 4C, and the total moment may be determined by the equation illustrated in FIG. 4D. Therefore, the radius $r_o$ of a representative loop that balances or otherwise mitigates an alternator coil may be determined from the equation given in FIG. 4E.

Experimental results conducted at NASA Glenn Research Center laboratory facilities show how the number of turns of a mitigating coil affects the mitigation achieved by a mitigating coil. A Stirling engine driven linear alternator was equipped with a mitigation coil connected in series with the alternator coil and the number of turns of the mitigation coil was varied. The magnetic field measured one meter from the linear alternator showed that winding a mitigating coil 18 turns about the linear alternator reduced the axial electromagnetic field by 52 percent; 19 turns reduced the field by 94 percent; and 20 turns reduced the field by 87 percent. It will be understood by those skilled in the art that the optimal number of turns of a mitigation coil may be determined through experimental protocols such as detecting the magnetic field at a given distance away from a linear alternator while varying the number of turns in a mitigating coil. In addition, other variables, such as spacing between turns of the mitigating coil, may also be optimized through such experimental protocols.

The invention has been described above and, obviously, modifications and alterations will occur to others upon the reading and understanding of this specification. The claims as follows are intended to include all modifications and alterations insofar as they come within the scope of the claims or the equivalent thereof.

We claim:

1. A electromagnetic field mitigation system comprising:
    a linear alternator or linear motor comprising:
    a magnet linearly movable along a path; and
    an alternator coil positioned about the magnet and configured to generate an electromotive force, resulting in a first magnetic field;
    a mechanism coupled to the linear alternator or linear motor to linearly oscillate the magnet along the path; and
    a mitigating coil positioned about the linear alternator or linear motor and configured to generate a second magnetic field, wherein the second magnetic field is configured to cancel out an externally emitted portion of the first magnetic field.

2. The electromagnetic field mitigation system of claim 1, where the mitigation coil is connected in series with the alternator coil.

3. The electromagnetic field mitigation system of claim 1, where the mechanism is a Stirling engine.

4. The electromagnetic field mitigation system of claim 3, where the Stirling engine is an Advanced Stirling Radioisotope Generator.

5. The electromagnetic field mitigation system of claim 1, where an electrical current passing through the mitigation coil travels in a direction opposite of an electrical current passing through the alternator coil.

6. The electromagnetic field mitigation system of claim 1, where the linear alternator or linear motor includes a stator positioned between the mitigation coil and the alternator coil.

7. The electromagnetic field mitigation system of claim 6, where the mitigation coil is adjacent to an outer surface of the stator.

8. The electromagnetic field mitigation system of claim 1, where the mitigation coil is positioned to be coaxial with the alternator coil.

* * * * *